(12) United States Patent
Kawa

(10) Patent No.: US 9,341,465 B2
(45) Date of Patent: May 17, 2016

(54) DIMENSION MEASURING APPARATUS, DIMENSION MEASURING METHOD, AND PROGRAM FOR DIMENSION MEASURING APPARATUS

(75) Inventor: Yasutaka Kawa, Osaka (JP)

(73) Assignee: Keyence Corporation, Osaka (JP)

( * ) Notice: Subject to any disclaimer, the term of this patent is extended or adjusted under 35 U.S.C. 154(b) by 1165 days.

(21) Appl. No.: 13/346,828

(22) Filed: Jan. 10, 2012

(65) Prior Publication Data

US 2012/0194672 A1 Aug. 2, 2012

(30) Foreign Application Priority Data

Feb. 1, 2011 (JP) ................................. 2011-019767

(51) Int. Cl.
*H04N 7/18* (2006.01)
*G01B 11/02* (2006.01)
*G01B 11/00* (2006.01)

(52) U.S. Cl.
CPC .............. *G01B 11/028* (2013.01); *G01B 11/00* (2013.01)

(58) Field of Classification Search
None
See application file for complete search history.

(56) References Cited

U.S. PATENT DOCUMENTS

| 6,816,609 B1 * | 11/2004 | Shimizu et al. ............... 382/151 |
| 7,590,276 B2 * | 9/2009 | Delaney ........................ 382/141 |
| 2002/0035717 A1 * | 3/2002 | Matsuoka ........................ 716/4 |
| 2006/0165275 A1 * | 7/2006 | Horita ................. G01B 11/2522 382/152 |
| 2007/0164219 A1 * | 7/2007 | Shishido ............... H01J 37/263 250/310 |

FOREIGN PATENT DOCUMENTS

| JP | 2009-300124 | 12/2009 |
| JP | 2009-300125 | 12/2009 |
| JP | 2010-019667 | 1/2010 |
| JP | 2010-032329 | 2/2010 |
| JP | 2010-032330 | 2/2010 |
| JP | 2010-032331 | 2/2010 |
| JP | 2010-032471 | 2/2010 |
| JP | 2010032471 A * | 2/2010 |
| JP | 2010-060528 | 3/2010 |
| JP | 2010-169584 | 8/2010 |

* cited by examiner

*Primary Examiner* — James M Anderson, II
(74) *Attorney, Agent, or Firm* — Kilyk & Bowersox, P.L.L.C.

(57) ABSTRACT

A dimension measuring apparatus is configured by: a movable stage; a measurement setting data storing section that holds feature amount information and measured position information; a low-magnification imaging section that photographs a workpiece with a low magnification; a workpiece detecting section that specifies a position and a posture of the workpiece in the low-magnification image based on the feature amount information; a stage controlling section that controls the movable stage 12 based on the specified location and posture such that the position to be measured of the workpiece stays within the high-magnification field of view; a high-magnification imaging section that photographs with a high magnification the position to be measured; an edge extracting section that extracts an edge of the position to be measured from the high-magnification image; and a dimension value calculating section that obtains a dimension value of the position to be measured.

6 Claims, 10 Drawing Sheets

MASTER IMAGE (LOW MAGNIFICATION)

MASTER IMAGE (HIGH MAGNIFICATION)

WORKPIECE IMAGE (LOW MAGNIFICATION)

WORKPIECE IMAGE (HIGH MAGNIFICATION)

WORKPIECE IMAGE

LOW-MAGNIFICATION MEASUREMENT

HIGH-MAGNIFICATION MEASUREMENT

DIMENSION MEASURING APPARATUS, DIMENSION MEASURING METHOD, AND PROGRAM FOR DIMENSION MEASURING APPARATUS

CROSS-REFERENCE TO RELATED APPLICATIONS

The present application claims foreign priority based on Japanese Patent Application No. 2011-019767, filed Feb. 1, 2011, the contents of which is incorporated herein by reference.

BACKGROUND OF THE INVENTION

1. Field of the Invention

The present invention relates to a dimension measuring apparatus, a dimension measuring method and a program for dimension measuring apparatus, and more specifically relates to improvement in dimension measuring apparatus which photographs a workpiece on a stage with different photographing magnifications to measure a dimension of the workpiece.

2. Description of Related Art

In general, a dimension measuring apparatus is an apparatus for measuring a dimension of a workpiece based on an edge of a workpiece image obtained by photographing a workpiece, and may be called an image measuring apparatus (e.g., Unexamined Japanese Patent Publication No. 2009-300124, Unexamined Japanese Patent Publication No. 2009-300125, Unexamined Japanese Patent Publication No. 2010-19667). Normally, a workpiece is placed in a movable stage that is movable in X-axis, Y-axis and Z-axis directions. The movable stage is moved in the Z-axis direction to perform focus adjustment of the workpiece image, and moved in the X-axis and Y-axis directions to perform positioning of the workpiece within a field of view.

The workpiece image has an extremely accurate similar shape to that of the workpiece regardless of the position of the movable stage in the Z-axis direction, and hence determining a distance and an angle on the image can detect an actual dimension on the workpiece image. In the case of measuring the dimension of the workpiece by means of such a dimension measuring apparatus, increasing a photographing magnification can lead to improvement in measurement accuracy. However, there has been a problem in that increasing the photographing magnification narrows the field of view to reduce a photographed area on the stage, thereby making the workpiece difficult to place within the photographed area. It is therefore considered that high-magnification photographing and low-magnification photographing are made switchable so as to perform postural adjustment of the workpiece and positioning thereof into a high-magnification field of view, while viewing a screen display of the workpiece image obtained by low-magnification photographing. However, there has been a problem with the conventional dimension measuring apparatus in that switching of the photographing magnification and postural adjustment and positioning of the workpiece should be manually performed, to cause an operating procedure to be complicated and dimension measurement to take a long time.

SUMMARY OF THE INVENTION

The present invention was made in view of the above circumstances, and an object of the present invention is to provide a dimension measuring apparatus capable of automatically transferring a workpiece within a low-magnification field of view into a high-magnification field of view, to measure a dimension of the workpiece with high accuracy.

In particular, an object is to provide a dimension measuring apparatus capable of measuring a desired dimension with high accuracy even when the workpiece is arranged in an arbitrary posture and an arbitrary position on a movable stage, so long as being arranged within the low-magnification field of view. Further, an object is to provide a dimension measuring apparatus capable of improving measurement accuracy while simplifying an operating procedure for dimension measurement, and also capable of reducing the time required for dimension measurement.

Moreover, an object of the present invention is to provide a dimension measuring method capable of measuring a workpiece with high accuracy while simplifying an operating procedure for dimension measurement, and also capable of reducing the time required for dimension measurement.

Furthermore, an object of the present invention is to provide a program for a dimension measuring apparatus, which makes a terminal device function as a dimension measuring apparatus as described above.

A dimension measuring apparatus according to a first present invention is a dimension measuring apparatus in which a low-magnification field of view is formed while a high-magnification field of view being narrower than the low-magnification field of view is formed within the low-magnification field of view, and a workpiece on a stage is photographed with different photographing magnifications to measure a dimension of the workpiece. The dimension measuring apparatus is configured including: a movable stage that is movable in XY directions; a measurement setting data storing section that holds feature amount information for detecting a workpiece from a photographed image and measured position information showing a position to be measured which is designated as an object to be measured; a low-magnification imaging section that photographs with a low magnification the workpiece within the low-magnification field of view, to generate a low-magnification image; a workpiece detecting section that specifies a position and a posture of the workpiece in the low-magnification image based on the feature amount information; a stage controlling section that controls the movable stage based on the specified location and posture such that the position to be measured of the workpiece stays within the high-magnification field of view; a high-magnification imaging section that photographs with a high magnification the position to be measured which has moved into the high-magnification field of view, to generate a high-magnification image; an edge extracting section that extracts an edge of the position to be measured from the high-magnification image based on the measured position information; and a dimension value calculating section that obtains a dimension value of the position to be measured based on the extracted edge.

In this dimension measuring apparatus, the position and the posture of the workpiece on the movable stage are specified by means of the low-magnification image obtained by photographing the workpiece with a low magnification, and the movable stage is controlled such that the position to be measured of the workpiece stays within the high-magnification field of view. Hence it is possible to automatically transfer the workpiece within the low-magnification field of view into the high-magnification field of view, so as to photograph the position to be measured with a high magnification. With such a configuration, even when the workpiece is arranged in an arbitrary posture and an arbitrary position on the movable stage, the workpiece is automatically transferred into the high-magnification field of view and the dimension value of the position to be measured can be obtained so long as being arranged within the low-magnification field of view, and hence it is possible to measure a desired dimension with high accuracy. Further, since the workpiece can be measured with a high magnification wherever and in whatever posture the workpiece is arranged so long as being arranged within the low-magnification field of view, it is possible to improve measurement accuracy while simplifying an operating procedure for dimension measurement, and also to reduce the time required for dimension measurement.

In addition to the above configuration, a dimension measuring apparatus according to a second present invention is configured including: a measured position information generating section that designates a position to be measured and a measuring method with respect to a master image obtained by the high-magnification imaging section photographing a master workpiece with a high magnification, to generate the measured position information; and a feature amount information generating section that generates the feature amount information formed of a checkup pattern image based on a master image obtained by the low-magnification imaging section photographing the master workpiece with a low magnification.

With such a configuration, since the position to be measured and the measuring method are designated with respect to the master image obtained by photographing the master workpiece with a high magnification, it is possible to designate with a high magnification a position wished to be measured for a workpiece having the same shape as the master workpiece. Further, since the feature amount information formed of the checkup pattern image is generated based on the master image obtained by photographing the master workpiece with a low magnification, checking between the pattern image and the low-magnification image obtained by photographing the workpiece with a low magnification can lead to accurate specification of the position and the posture of the workpiece having the same shape as the master workpiece.

In addition to the above configuration, a dimension measuring apparatus according to a third present invention is configured such that in the case of the presence of two or more workpieces that cannot stay within the high-magnification field of view, the stage controlling section sequentially moves the movable stage with respect to these workpieces so as to allow positions to be measured to stay within the high-magnification field of view.

With such a configuration, even in the case of the presence of a plurality of workpieces that cannot stay within the high-magnification field of view, the movable stage is sequentially moved so as to allow positions to be measured to stay within the high-magnification field of view, and hence it is possible to automatically transfer these workpieces sequentially into the high-magnification field of view, so as to obtain dimension values of the positions to be measured.

In addition to the above configuration, a dimension measuring apparatus according to a fourth present invention is configured such that in the case of the presence of two or more positions to be measured for the same workpiece, which cannot stay within the high-magnification field of view, the stage controlling section sequentially moves the movable stage with respect to the positions to be measured so as to allow the positions to be measured to stay within the high-magnification field of view.

With such a configuration, since the movable stage is sequentially moved so as to allow the positions to be measured to stay within the high-magnification field of view, even in the case of the presence of a plurality of positions to be measured for the same workpiece, which cannot stay within the high-magnification field of view, it is possible to automatically transfer these positions to be measured sequentially into the high-magnification field of view, so as to obtain the dimension values of the positions to be measured.

A dimension measuring apparatus according to a fifth present invention is configured such that the edge extracting section performs, based on the low-magnification image, edge extraction on a position to be measured whose dimension measurement with a low magnification has been designated in the measured position information, and the stage controlling section moves the movable stage with respect to the position to be measured whose dimension measurement with a high magnification has been designated in the measured position information so as to allow the position to be measured to stay within the high-magnification field of view.

With such a configuration, a dimension of the position to be measured which cannot stay within the high-magnification field of view are measured with a low magnification, and a dimension of the position to be measured which stays within the high-magnification field of view are measured with a high magnification, thereby allowing measurement of a dimension value with high accuracy.

A dimension measuring method according to a sixth present invention is a dimension measuring method in which a low-magnification field of view is formed while a high-magnification field of view being narrower than the low-magnification field of view is formed within the low-magnification field of view, and a workpiece on a stage is photographed with different photographing magnifications to measure the dimension of the workpiece. The dimension measuring method is configured including: a measurement setting data storing step for storing feature amount information for detecting a workpiece from a photographed image and measured position information showing a position to be measured which is designated as an object to be measured; a low-magnification imaging step for photographing with a low magnification the workpiece within the low-magnification field of view, to generate a low-magnification image; a workpiece detecting step for specifying a position and a posture of the workpiece in the low-magnification image based on the feature amount information; a stage controlling step for controlling the movable stage in XY directions based on the specified location and posture such that the position to be measured of the workpiece stays within the high-magnification field of view; a high-magnification imaging step for photographing with a high magnification the position to be measured which has moved into the high-magnification field of view, to generate a high-magnification image; an edge extracting step for extracting an edge of the position to be measured from the high-magnification image based on the specified location and posture and the measured position information; and a dimension value calculating step for obtaining a dimension value of the position to be measured based on the extracted edge.

A program for a dimension measuring apparatus according to a seventh present invention is a program for forming a low-magnification field of view, while forming a high-magnification field of view being narrower than the low-magnification field of view within the low-magnification field of view, and photographing a workpiece on a stage with different photographing magnifications, to measure the dimension of the workpiece. The program for a dimension measuring apparatus is configured including: a measurement setting data storing procedure for storing feature amount information for detecting a workpiece from a photographed image and measured position information showing a position to be measured which is designated as an object to be measured; a low-magnification imaging procedure for photographing with a low magnification the workpiece within the low-magnification field of view, to generate a low-magnification image; a workpiece detecting procedure for specifying a position and a posture of the workpiece in the low-magnification image based on the feature amount information; a stage controlling procedure for controlling the movable stage in XY directions based on the specified location and posture such that the position to be measured of the workpiece stays within the high-magnification field of view; a high-magnification imaging procedure for photographing with a high magnification the position to be measured which has moved into the high-magnification field of view, to generate a high-magnification image; an edge extracting procedure for extracting an edge of the position to be measured from the high-magnification image based on the specified location and posture and the measured position information; and a dimension value calculating procedure for obtaining a dimension value of the position to be measured based on the extracted edge.

In the dimension measuring apparatus according to the present invention, even when a workpiece is arranged in an arbitrary posture and an arbitrary position on the movable stage, the workpiece is automatically transferred into a high-magnification field of view and a dimension value of a position to be measured can be obtained so long as being arranged within a low-magnification field of view, and hence it is possible to measure desired dimensions with high accuracy. Further, since the workpiece can be measured with a high magnification wherever and in whatever posture the workpiece is arranged so long as being arranged within the low-magnification field of view, it is possible to improve measurement accuracy while simplifying an operating procedure for dimension measurement, and also to reduce the time required for dimension measurement.

Moreover in the dimension measuring method according to the present invention, since the workpiece can be measured with a high magnification wherever and in whatever posture the workpiece is arranged so long as being arranged within the low-magnification field of view, it is possible to improve measurement accuracy while simplifying an operating procedure for dimension measurement, and also to reduce the time required for dimension measurement.

Furthermore, in the program for a dimension measuring apparatus according to the present invention, it is possible to make a terminal device function as a dimension measuring apparatus as described above.

DETAILED DESCRIPTION OF PREFERRED EMBODIMENTS

<Dimension Measuring Apparatus 1>

Figure 1:
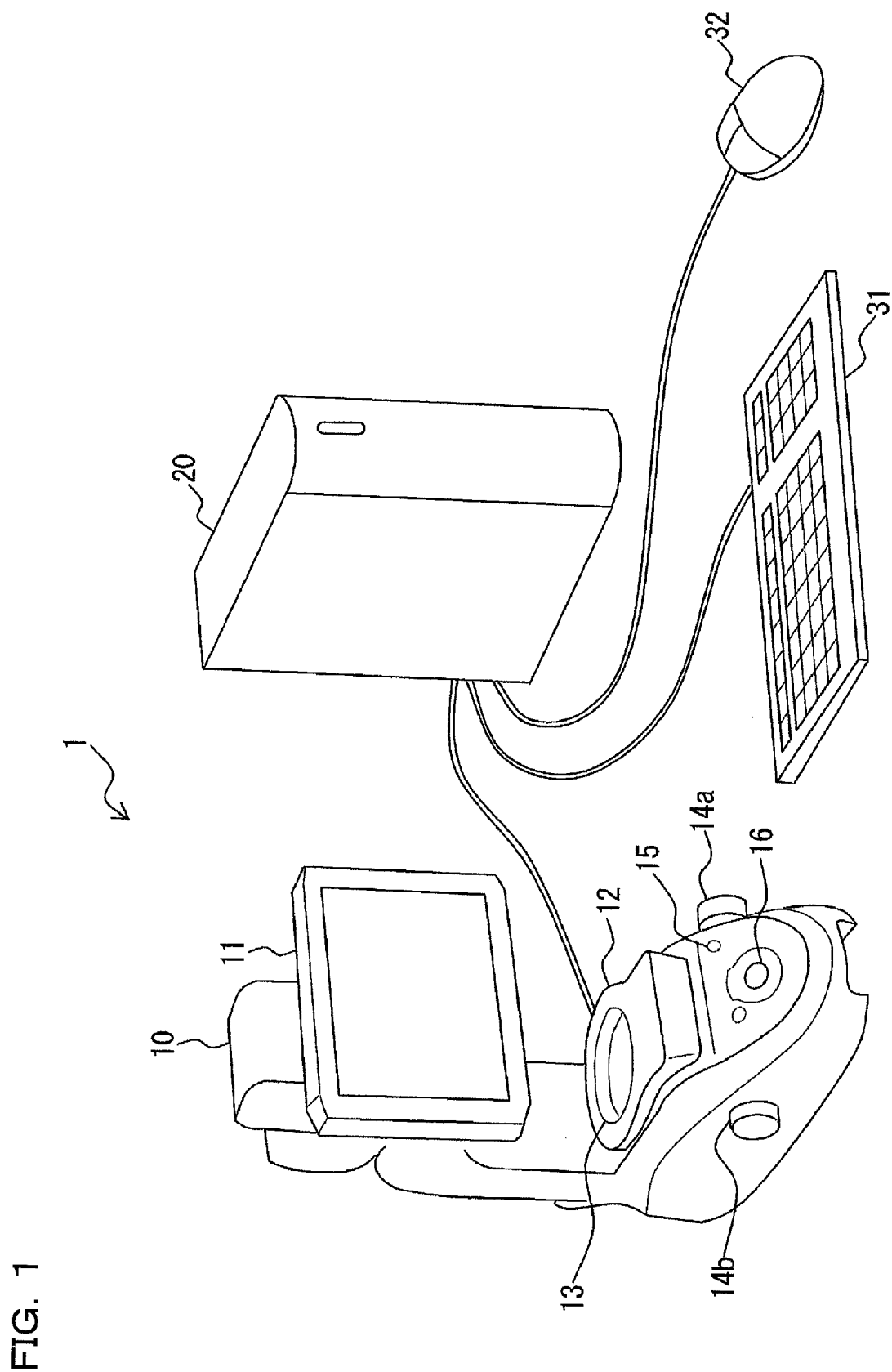
FIG. 1 is a perspective view showing a constitutional example of a dimension measuring apparatus 1 according to an embodiment of the present invention.

FIG. 1 is a perspective view showing a constitutional example of a dimension measuring apparatus 1 according to an embodiment of the present invention. This dimension measuring apparatus 1 is an image measuring apparatus that photographs a workpiece arranged on a movable stage 12 and analyzes the photographed image, to measure a dimension of the workpiece. The dimension measuring apparatus 1 is configured by a measurement unit 10, a control unit 20, a keyboard 31 and a mouse 32. The workpiece is an object to be measured whose shape and dimensions are to be measured.

The measurement unit 10 is an optical-system unit that applies illumination light to the workpiece and receives transmitted light transmitted through the workpiece or reflected light reflected by the workpiece, to generate a photographed image. The measurement unit 10 is provided with a display 11, a movable stage 12, an XY-position adjustment knob 14a, a Z-position adjustment knob 14b, a power switch 15 and a measurement start button 16.

The display 11 is a display that screen-displays the photographed image, a measurement result and measurement condition setting screen. The movable stage 12 is a mounting stage for mounting a workpiece as an object to be measured, and is formed with a detection area 13, through which illumination light is transmitted, within a roughly horizontal and flat mounting surface thereof. The detection area 13 is a circular area made of transparent glass. This movable stage 12 can be moved in a Z-axis direction which is parallel to a photographing axis and in each of an X-axis direction and a Y-axis direction which are vertical to the photographing axis.

The XY-position adjustment knob 14a is an operating section for moving the movable stage 12 in the X-axis direction and the Y-axis direction. The Z-position adjustment knob 14b is an operating section for moving the movable stage 12 in the Z-axis direction. The power switch 15 is an operating section for turning on or off a power supply of the measurement unit 10 and the control unit 20, and the measurement start button 16 is an operating section for stating dimension measurement.

The control unit 20 is a controller that controls the display 11 and the movable stage 12 of the measurement unit 10, and analyzes a workpiece image photographed by the measurement unit 10, to calculate the dimension of the workpiece. The keyboard 31 and the mouse 32 are connected to the control unit 20. After turning on the power supply, appropriately arranging a workpiece within the detection area 13 and operating the measurement start button 16 lead to automatic measurement of the workpiece.

<Measurement Unit 10>

Figure 2:
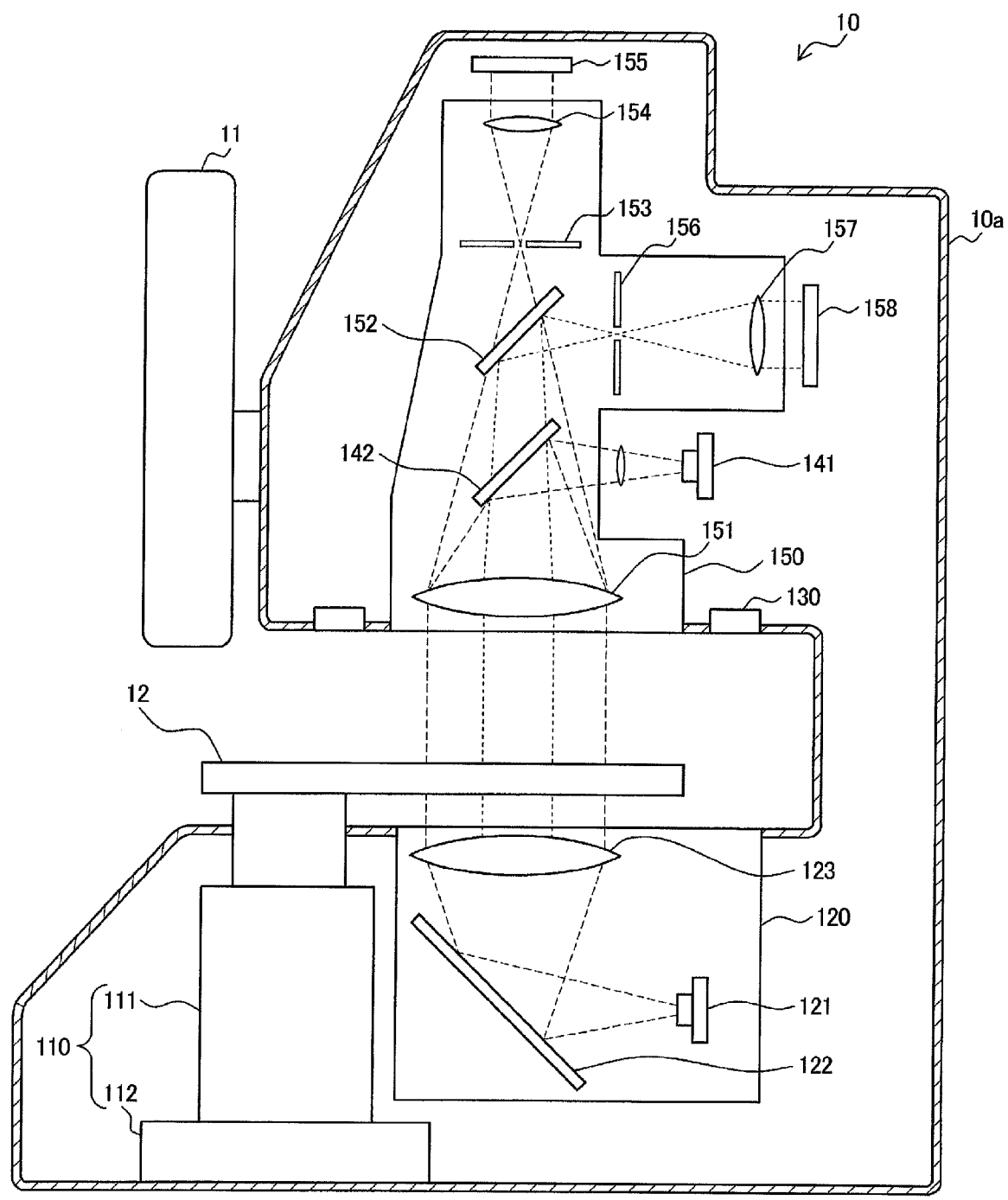
FIG. 2 is an explanatory view of a constitutional example of the inside of the measurement unit 10 of FIG. 1, showing a cut surface in the case of cutting the measurement unit 10 along its vertical plane.

FIG. 2 is an explanatory view of a constitutional example of the inside of the measurement unit 10 of FIG. 1, showing a cut surface in the case of cutting the measurement unit 10 along its vertical plane. This measurement unit 10 includes the display 11, the movable stage 12, a stage driving unit 110, a transmitted illumination unit 120, a ring illumination unit 130, a coaxial epi-illumination light source 141, a light-receiving lens unit 150, and imaging elements 155 and 158.

The display 11 and the movable stage 12 are arranged outside a housing 10a. The stage driving unit 110, the transmitted illumination unit 120, the ring illumination unit 130, the coaxial epi-illumination light source 141, the light-receiving lens unit 150 and the imaging elements 155 and 158 are accommodated inside the housing 10a. Further, the stage driving unit 110 and the transmitted illumination unit 120 are arranged below the movable stage 12. The ring illumination unit 130, the coaxial epi-illumination light source 141, the light-receiving lens unit 150 and the imaging elements 155 and 158 are arranged above the movable stage 12.

This measurement unit 10 applies illumination light to the workpiece arranged within the detection area 13 of the movable stage 12, and receives the transmitted light or reflected light, to allow the imaging elements 155 and 158 to form an image so as to acquire a workpiece image. This workpiece image is analyzed to measure the dimension of the workpiece, thereby allowing display of a measurement result on the display 11. The workpiece on the movable stage 12 can be photographed with different photographing magnifications. For example, it is possible to select between a low-magnification photographing, in which a photographed area with a diameter of the order of 25 mm is regarded as a photographed field of view, and a high-magnification photographing, in which a photographed area with a diameter of the order of 6 mm is regarded as a photographed field of view. A low-magnification image obtained by photographing the workpiece with a low magnification and a high-magnification image obtained by photographing the workpiece with a high magnification can be electrically switched and displayed on the display 11.

The stage driving unit 110 is a driving unit that moves the movable stage 12 based on a control signal from the control unit 20, and is made up of a Z-driving section 111 and an XY driving section 112. The Z driving section 111 is a Z-position adjusting section that moves the movable stage 12 in the Z-axis direction within a predetermined range, for adjusting a position of the workpiece in the photographing axis direction. The XY driving section 112 is an XY position adjusting section that moves the movable stage 12 in the X-axis direction and the Y-axis direction within a predetermined range, for adjusting the position of the workpiece in the photographing axis direction.

The transmitted illumination unit 120 is an illumination device for applying illumination light from below to the workpiece arranged within the detection area 13 of the movable stage 12, and is made up of a transmitted illumination light source 121, a mirror 122 and an optical lens 123. Transmitted illumination light launched from the transmitted illumination light source 121 is reflected by the mirror 122 and launched via the optical lens 123. This transmitted illumination light is transmitted through the movable stage 12, and a part of the transmitted light is cut off by the workpiece, while the other part thereof is incident on the light-receiving lens unit 150. The transmitted illumination is suitable for measurement of an outer shape of a workpiece and an inner diameter of a through hole.

The ring illumination unit 130 is an epi-illumination device for applying illumination light to the workpiece to the movable stage 12 from above, and is made up of a ring-like light source surrounding a light-receiving section of the light-receiving lens unit 150. This ring illumination unit 130 is an illumination device capable of performing separate lighting, and the entire perimeter of the unit, or only a part thereof, can be lighted.

The coaxial epi-illumination light source 141 is a light source for applying illumination light, having substantially the same launched light axis as the photographing axis, to the workpiece on the movable stage 12 from above. Inside the light-receiving lens unit 150A, there is arranged a half mirror 142 for branching off the illumination light into a launched light axis and the photographing axis. The epi-illumination is suitable for measurement of dimensions of a workpiece having different levels. As a workpiece illuminating method, transmitted illumination, ring illumination or coaxial epi-illumination can be selected. Especially, a position wished to be measured and an illuminating method with respect to each workpiece can be automatically switched to perform dimension measurement.

The light-receiving lens unit 150 is an optical system made up of a light-receiving lens 151, the half mirror 152, diaphragm plates 153 and 156, and image forming lenses 154 and 157. The light-receiving lens unit 150 receives transmitted illumination light and light reflected by the workpiece, to allow the imaging elements 155 and 158 to form an image. The light-receiving lens 151 is an objective lens which is arranged as opposed to the movable stage 12, and is shared in use for high-magnification photographing and low-magnification photographing. This light-receiving lens 151 has a property of holding a size of an image unchanged even when a position of a workpiece in the Z-axis direction changes. The light-receiving lens 151 is called a telecentric lens.

The diaphragm plate 153 and the image forming lens 154 are a low-magnification-side image forming lens section, and arranged on the same axis as the light-receiving lens 151. The image forming lens 154 is an optical lens arranged as opposed to the imaging element 155.

On the other hand, the diaphragm plate 156 and the image forming lens 157 are a high-magnification-side image forming lens section, and a high-magnification photographing axis is branched off from the low-magnification photographing axis by the half mirror 152. The image forming lens 157 is an optical lens arranged as opposed to the imaging element 158.

The imaging element 155 is an image sensor for low magnification which photographs with a low magnification a workpiece within a low-magnification field of view formed by the light-receiving lens unit 150, to generate a low-magnification image. The imaging element 158 is an image sensor for high magnification which photographs with a high magnification a workpiece within a high-magnification field of view formed by the light-receiving lens unit 150, to generate a high-magnification image. The high-magnification field of view is a narrower photographed field of view than the low-magnification field of view, and is formed within the low-magnification field of view.

The imaging elements 155 and 158 are each made up of a semiconductor element such as CCD (Charge Coupled Devices) or CMOS (Complementary Metal Oxide Semiconductor).

In this dimension measuring apparatus 1, wherever and in whatever posture the workpiece is arranged, the workpiece is captured so long as being arranged within the detection area 13 of the movable stage 12, and the low-magnification image is then analyzed to move the movable stage 12 in the X-axis direction or the Y-axis direction, thereby to automatically transfer the workpiece into the high-magnification field of view.

Figure 3:
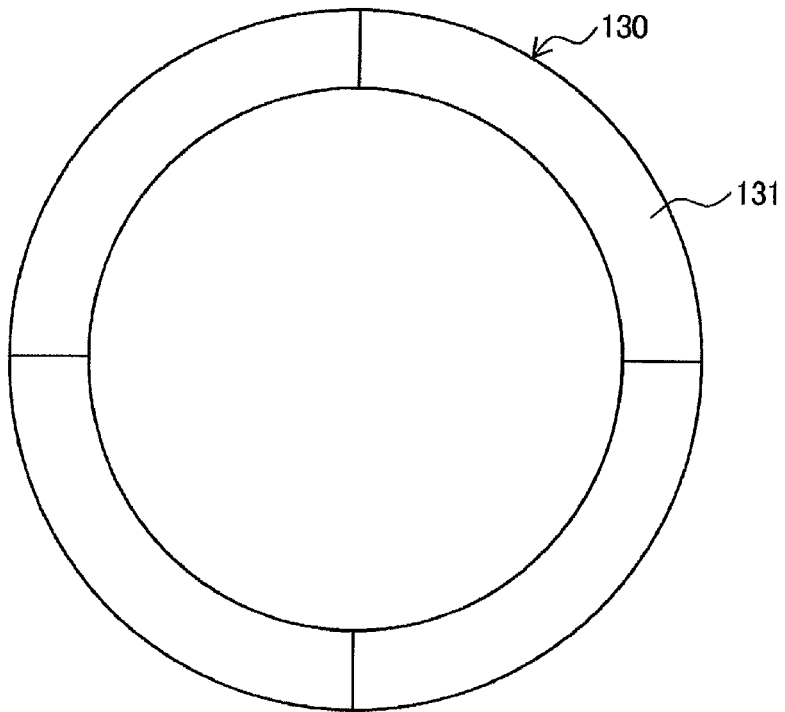
FIG. 3 is a view showing a constitutional view of a ring illumination unit 130 of FIG. 2.

FIG. 3 is a view showing a constitutional view of the ring illumination unit 130 of FIG. 2. This ring illumination unit 130 is made up of four light-emitting blocks 131 arranged on a circumference, and can be lighted by arbitrarily selecting the light-emitting blocks 131.

It can be designated in the measured position information as to which light-emitting block 131 is to be lighted at the time of dimension measurement. Especially in the case of measuring a plurality of positions to be measured for the same workpiece W, the light-emitting block 131 to be lighted with respect to each of these positions to be measured can be designated.

<Operation of Dimension Measuring Apparatus 1>

Figure 4:
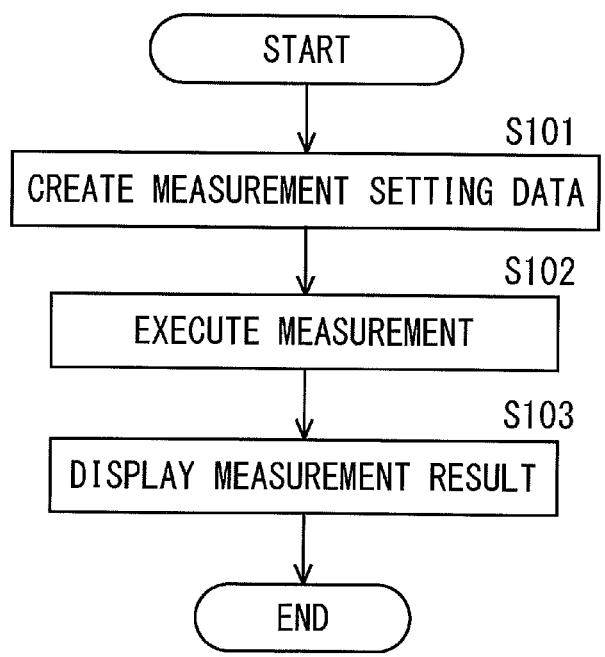
FIG. 4 is a flowchart showing an example of operations in the dimension measuring apparatus 1 of FIG. 1.

Steps S101 to S103 of FIG. 4 are a flowchart showing an example of operations of the dimension measuring apparatus 1 of FIG. 1. In this dimension measuring apparatus 1, the operation is made up of three processes, namely, creation of measurement setting data (Step S101), execution of measurement (Step S102), and display of a measurement result (Step S103).

The measurement setting data is information required for execution of measurement, and is made up of feature amount information showing a feature amount, measured position information showing a position to be measured and a type of measurement, and design value information showing a design value and a tolerance with respect to each position to be measured. The feature amount information is information for positioning which is used for analyzing a workpiece image to detect a position and a posture of the workpiece. The feature amount information is set based on predetermined master data. It is to be noted that, when the feature amount information and the measured position information are ones having been set based on a high-magnification image, discrimination information indicative of such setting is held as measurement setting data.

The measurement setting data is created in the control unit 20. Alternatively, there may be a configuration where measurement setting data created in an information processing terminal such as a PC (personal computer) is transferred to the control unit 20 and then used. Measurement processing is executed based on such measurement setting data. Then, dimension values obtained by measurement and a result of quality determination are displayed on the display 11, to perform display processing for the measurement result.

<Creation of Measurement Setting Data>

Figure 5:
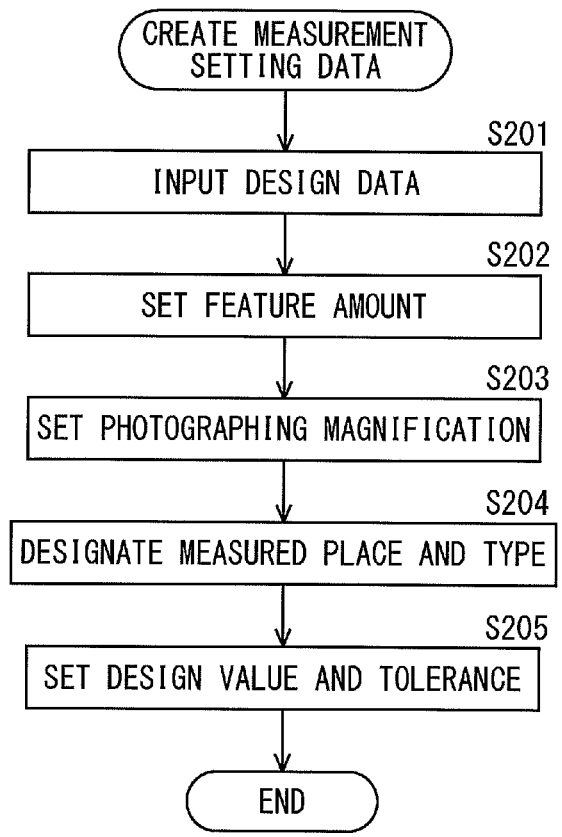
FIG. 5 is a flowchart showing an example of the operations in the dimension measuring apparatus 1 of FIG. 1 at the time of creating measurement setting data.

Steps S201 to S205 of FIG. 5 are a flowchart showing an example of the operations in the dimension measuring apparatus 1 of FIG. 1 at the time of creating measurement setting data. This figure shows the case of creating measurement setting data in the control unit 20.

The measurement setting data creating processing is made up of five processing procedures shown below. First, design data is inputted (Step S201). In inputting the design data, master data for use in feature amount setting and shape comparison is acquired. The master data is formed of a photographed image obtained by photographing a master workpiece, or CAD (Computer Aided Design) data or a CAD image created by means of CAD. An example of the case of using a master image, obtained by photographing a master workpiece, as master data will be described here.

Next, a feature amount is set (Step S202). Feature amount information and a measurement range are set based on the master image, thereby to set the feature amount. Next, a photographing magnification is set (Step S203). In setting the photographing magnification, either low-magnification dimension measurement or high-magnification dimension measurement is designated with respect to the feature amount set in Step S202, and the photographing magnification information is held in association with the feature amount. When a plurality of feature amounts are set, photographing magnification information is associated with respect to each feature amount.

Next, a position to be measured and a type of measurement are designated (Step S204). Specifically, the designation of those is performed by designating a position to be measured, an edge detection area and a measuring method with respect to the master image displayed on the display 11.

The edge detection area is an image processing area for analyzing a change in brightness in image data therewithin, to extract an edge. In designating the type of measurement, a measuring method of what is measured in which manner is selected. Upon completion of designation of the position to be measured and the type of measurement, dimension measurement is executed on the master image. That is, an edge of the position to be measured is extracted with respect to the master image, to calculate a dimension value of the position to be measured by a designated measuring method. A measurement result of the dimension value is, for example, displayed on the master image.

Next, a design value and a tolerance are set (Step S205). In setting the design value and the tolerance, the displayed dimension value with respect to each position to be measured is changed according to the need, and set as a design value. Further, a tolerance is set in association with the design value. The measurement setting data created in this manner is written into a memory inside the control unit 20.

<Photographed Field of View>

Figure 6:
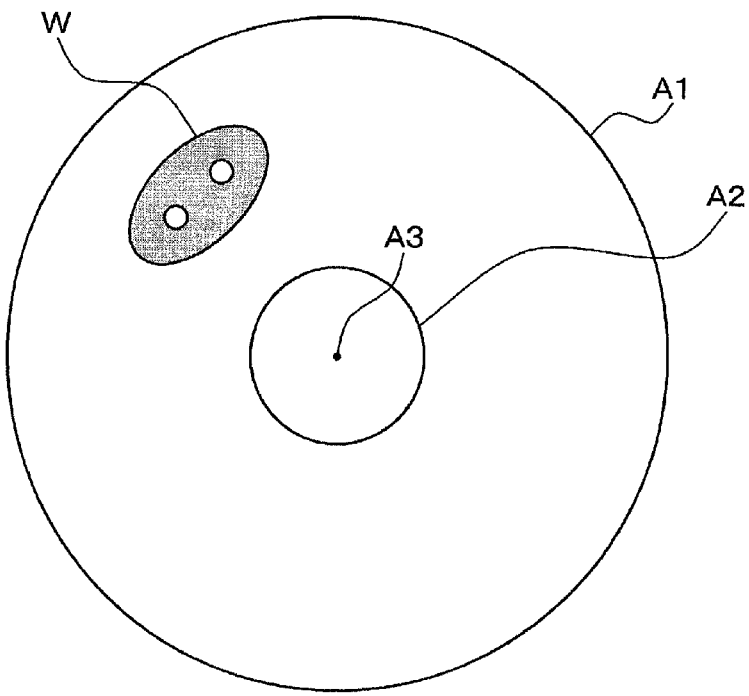
FIG. 6 is a view showing an example of photographed fields of view formed in the dimension measuring apparatus 1 of FIG. 1, showing a boundary A1 of a low-magnification field of view, a boundary A2 of a high-magnification field of view, and a center A3 of the fields of view.

FIG. 6 is a view showing an example of photographed fields of view formed in the dimension measuring apparatus 1 of FIG. 1, showing a boundary A1 of a low-magnification field of view, a boundary A2 of a high-magnification field of view, and a center A3 of the fields of view. This boundary A1 is formed in a circular shape, and expresses a photographed area on the movable stage 12. When the movable stage 12 is located in a reference position, a low-magnification photographed area agrees with the detection area 13.

The high-magnification field of view is a narrower photographed field of view than the low-magnification field of view, and is formed so as to have the field-of-view center A3 in substantially agreement with the low-magnification field of view. The workpiece W may be arranged in an arbitrary posture and an arbitrary position on the movable stage 12 so long as being arranged within such a low-magnification field of view.

<Master Image>

Figure 7A:
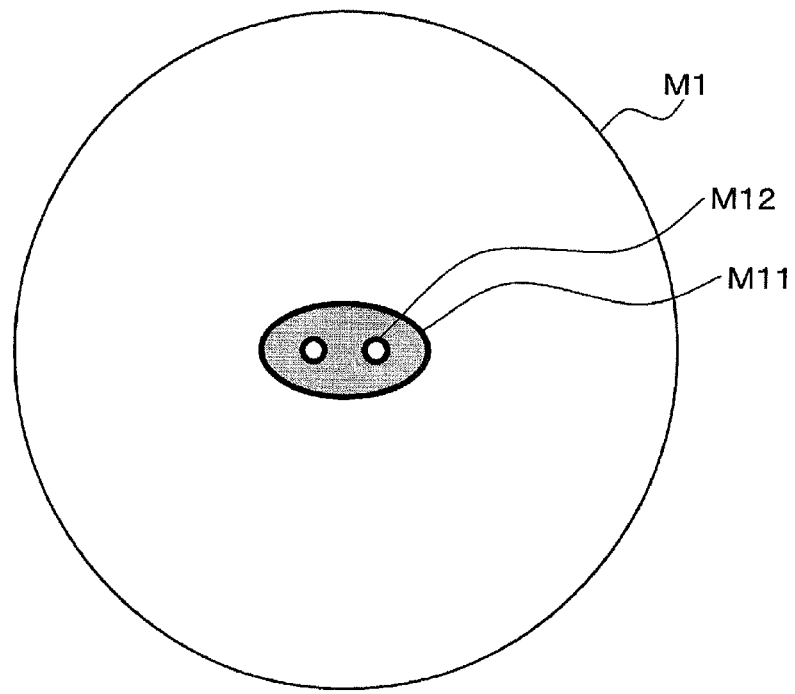
FIGS. 7A and 7B are views showing an example of the operations in the dimension measuring apparatus 1 of FIG. 1 at the time of creating measurement setting data, showing master images M1, M2 obtained by photographing a master workpiece.
Figure 7B:
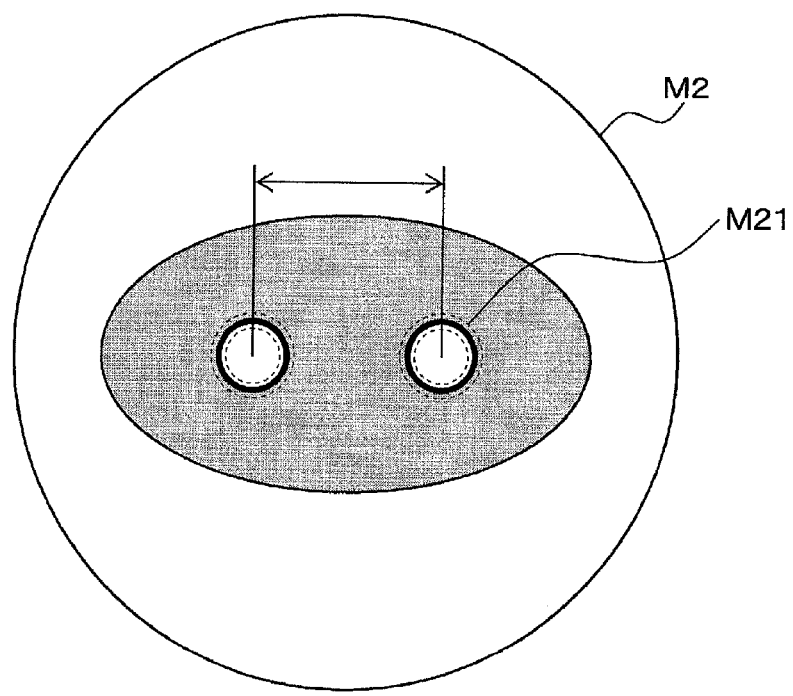

FIGS. 7A and 7B are views showing an example of the operations in the dimension measuring apparatus 1 of FIG. 1 at the time of creating measurement setting data, showing master images M1 and M2 obtained by photographing the master workpiece. This figure shows the case of photographing by means of transmitted illumination, where FIG. 7A shows the master image M1 obtained by photographing with a low magnification and FIG. 7B shows the master image M2 obtained by photographing with a high magnification.

The master workpiece is a reference object having the same shape as the workpiece W as the object to be measured. The master image M1 is used for specifying a position and a posture of the workpiece W within the low-magnification image obtained by photographing the workpiece W with a low magnification. For example, edges M11 and M12 of the master workpiece are extracted from the master image M1, thereby to create a pattern image to be checked with the low-magnification image of the workpiece W.

The master image M2 is used for designating a position to be measured and a measuring method. For example, an edge detection area M21 can be designated with respect to the master image M2. In addition, the master image M2 may be used for specifying with high accuracy the position and the posture of the workpiece W within the high-magnification image obtained by photographing the workpiece W with a high magnification.

<Measurement Processing>

Figure 8:
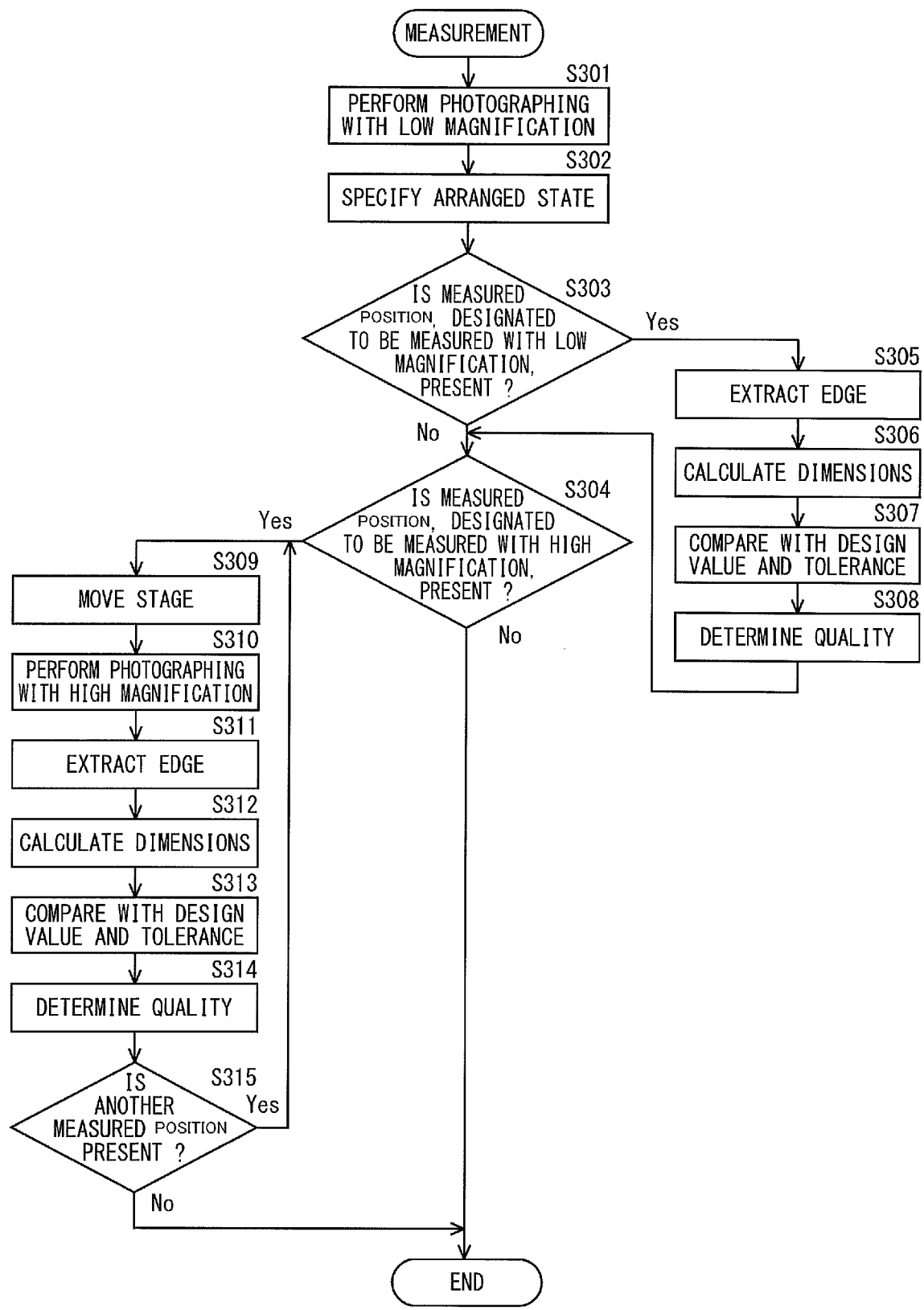
FIG. 8 is a flowchart showing an example of the operations in the dimension measuring apparatus 1 of FIG. 1.

Steps S301 to S315 of FIG. 8 are a flowchart showing an example of the operations in the dimension measuring apparatus 1 of FIG. 1 at the time of measurement. When the workpiece W is arranged on the movable stage 12 and measurement execution is designated by an operation of the measurement start button 16 or the like, first, the workpiece W on the movable stage 12 is photographed with a low magnification, to acquire a low-magnification image (Step S301).

Next, this low-magnification image is checked with a previously registered pattern image as feature amount information, to specify an arranged state of the workpiece W such as its location and posture (Step S302). At this time, when there is present a position to be measured whose dimension measurement with a low magnification has been designated, dimension measurement is executed on the position to be measured (Step S303).

Specifically, a position to be measured is specified and an edge is extracted based on an arrange state of the workpiece W and previously registered measured position information (Step S305). Then a dimension value of the position to be measured is calculated based on the extracted edge of the position to be measured (Step S306).

Further, an error is obtained from a difference between the calculated dimension value and a previously registered design value as design value information, and the error is then compared with a tolerance with respect thereto (Step S307), to perform quality determination on each position to be measured and quality determination on the workpiece W (Step S308).

Next, when there is present a position to be measured whose dimension measurement with a high magnification has been designated in the measured position information, the dimension measurement is executed on the position to be measured (Step S304). Specifically, based on the arranged state of the workpiece W and the measured position information, the movable stage 12 is moved in the X-axis direction or the Y-axis direction such that the position to be measured of the workpiece W stays within the high-magnification field of view (Step S309), and the position to be measured which has moved into the high-magnification field of view is photographed with a high magnification, thereby to acquire a high-magnification image (Step S310). Then, based on the arranged state of the workpiece W and the measured position information, the position to be measured is specified and edge extraction is performed (Step S311). Based on the extracted edge of the position to be measured, a dimension value of the position to be measured is calculated (Step S312).

Further, an error is obtained from a difference between the calculated dimension value and the design value, and the error is then compared with a tolerance corresponding to the error (Step S313), to perform quality determination on each position to be measured and quality determination on the workpiece W (Step S314).

The processing procedures from Steps 309 to S314 are repeated when there is present another position to be measured which cannot stay within the high-magnification field of view among the positions to be measured whose dimension measurement with a high magnification have been designated (Step S315).

<Workpiece Image>

Figure 9A:
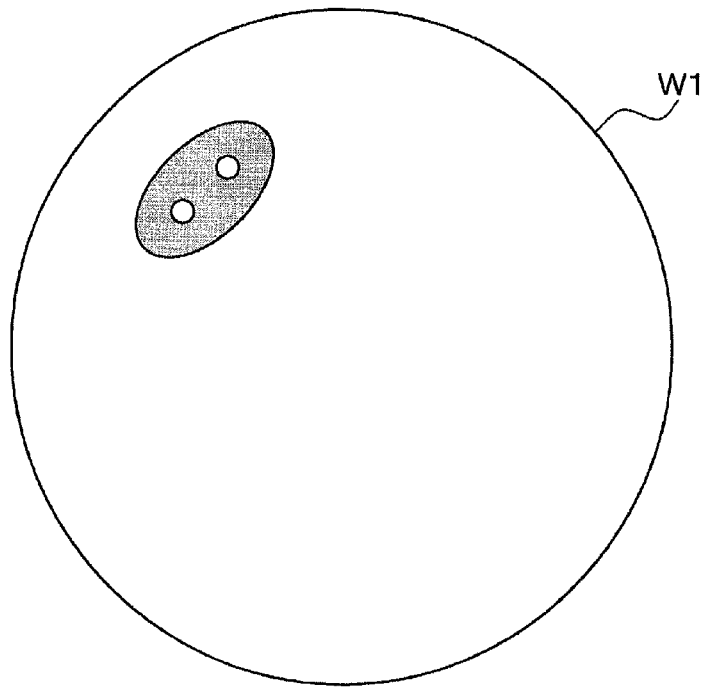
FIGS. 9A and 9B are views showing an example of the operations in the dimension measuring apparatus 1 of FIG. 1 at the time of measurement, showing workpiece images W1, W2 obtained by photographing the workpiece W.
Figure 9B:
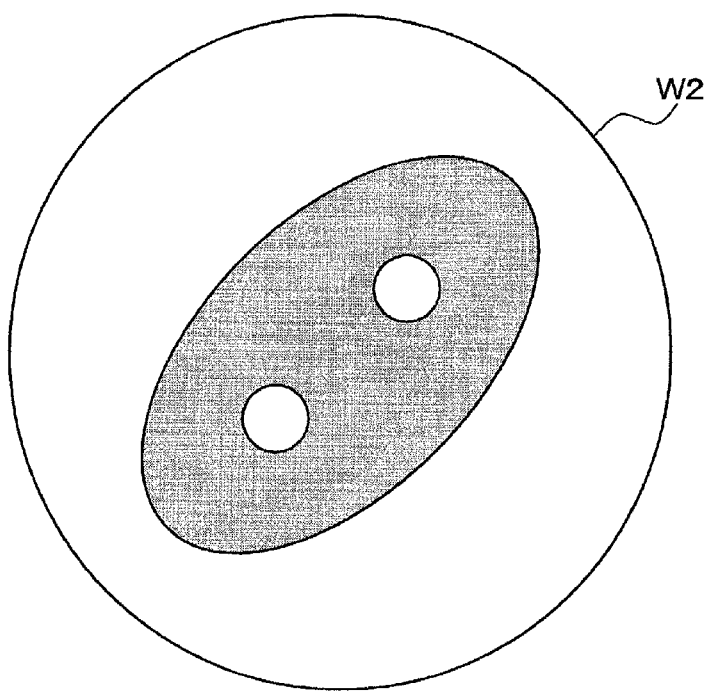

FIGS. 9A and 9B are views showing an example of the operations in the dimension measuring apparatus 1 of FIG. 1 at the time of measurement, showing workpiece images W1 and W2 obtained by photographing the workpiece W. FIG. 9A shows the workpiece image W1 obtained by photographing with a low magnification, and FIG. 9B shows the workpiece image W2 obtained by photographing with a high magnification.

The workpiece image W1 is checked with the pattern image registered as the feature amount information, to specify the position and the posture of the workpiece W within the workpiece image W1. The movable stage 12 is controlled based on such a detection result of the arranged state as thus described, to automatically transfer the workpiece W into the high-magnification field of view so as to acquire the workpiece image W2 as a high-magnification image of the position to be measured.

Figure 10:
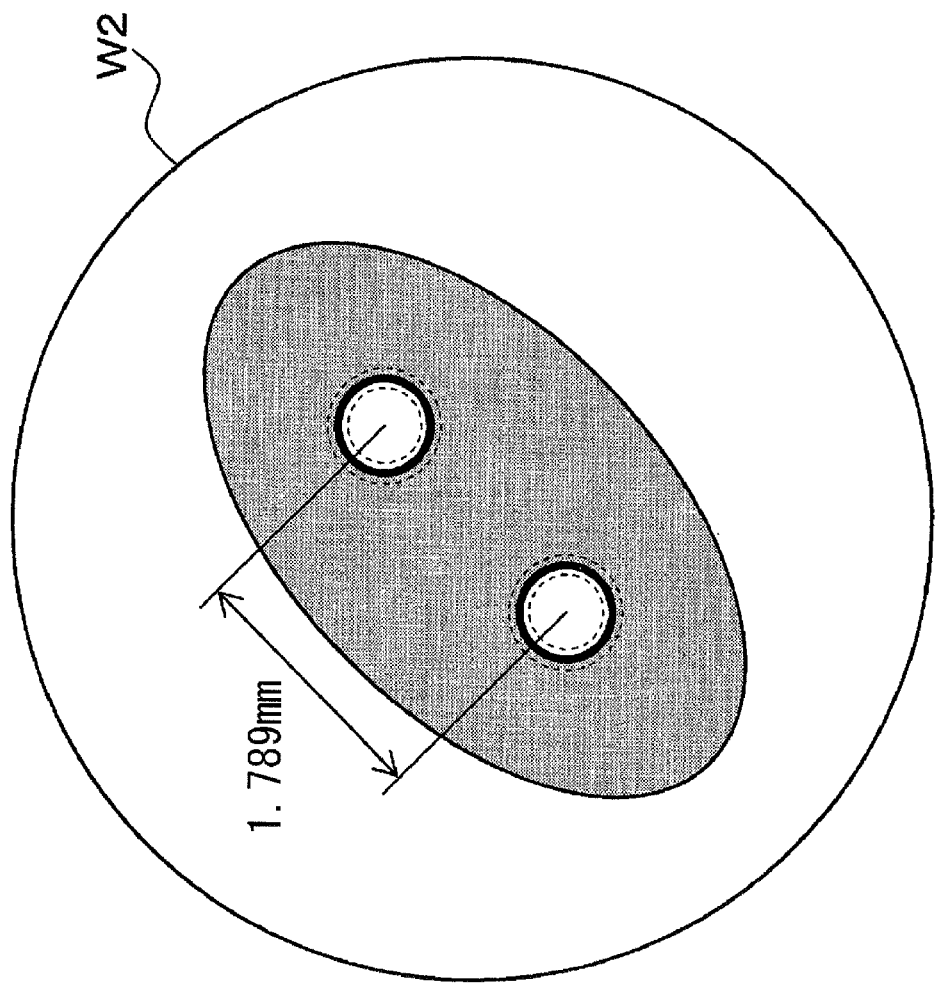
FIG. 10 is a view showing an example of the operations in the dimension measuring apparatus 1 of FIG. 1 at the time of displaying a measurement result, showing the workpiece image W2 with the measurement result arranged therein.

FIG. 10 is a view showing an example of the operations in the dimension measuring apparatus 1 of FIG. 1 at the time of displaying a measurement result, showing the workpiece image W2 with the measurement result arranged therein. An edge of the position to be measured is extracted from the workpiece image W2, to calculate a dimension value of the position to be measured.

The measurement result such as the dimension value can be displayed on the display 11 along with the workpiece image W2. In this example, a dimension value "1.789 mm" and a dimension line are arranged on the workpiece image W2 in association with the position to be measured.

Figure 11A:
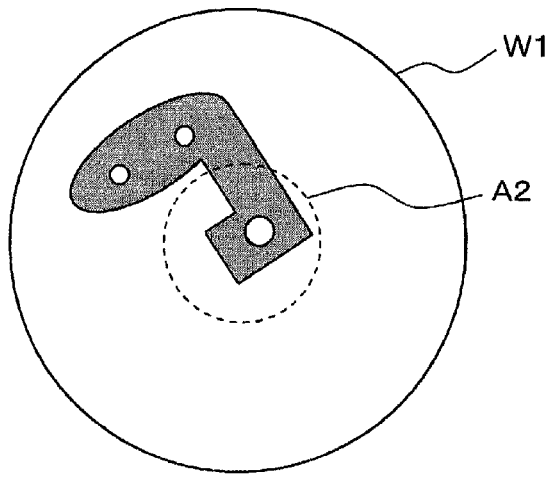
FIGS. 11A to 11C are views showing another example of the operations in the dimension measuring apparatus 1 of FIG. 1 at the time of measurement.
Figure 11B:
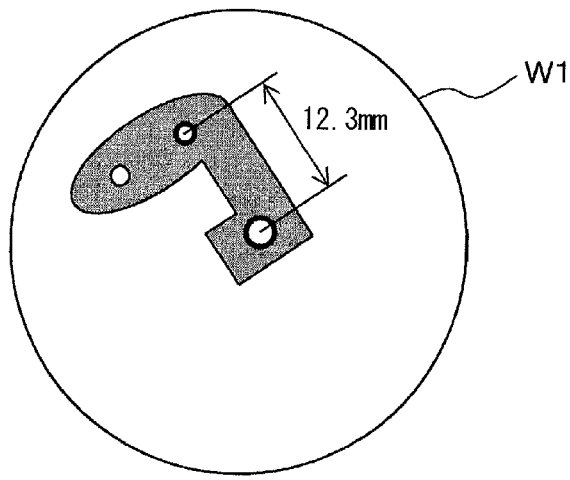
Figure 11C:
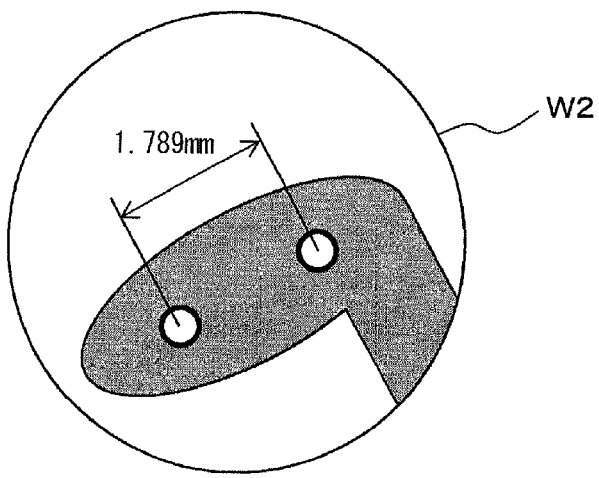

FIGS. 11A to 11C are views showing another example of the operations in the dimension measuring apparatus 1 of FIG. 1 at the time of measurement, showing the states of sequential execution of low-magnification measurement and high-magnification measurement. FIG. 11A shows a workpiece image W1 obtained by measurement with a low magnification, FIG. 11B shows the workpiece image W1 added with a dimension value obtained by measurement with a low magnification, and FIG. 11C shows the workpiece image W2 added with a dimension value obtained by measurement with a high magnification.

When a position to be measured which cannot stay within the high-magnification field of view is present in the workpiece W as the object to be measured, it is necessary as a measuring method to designate dimension measurement of such a position to be measured with a low magnification. A dimension value of the position to be measured, whose dimension measurement with a low magnification has been designated, is obtained by analyzing the low-magnification workpiece image W1.

On the other hand, a dimension value of the position to be measured, which stays within the high-magnification field of view, can be obtained with high accuracy by analyzing the high-magnification workpiece image W2.

<Control Unit 20>

Figure 12:
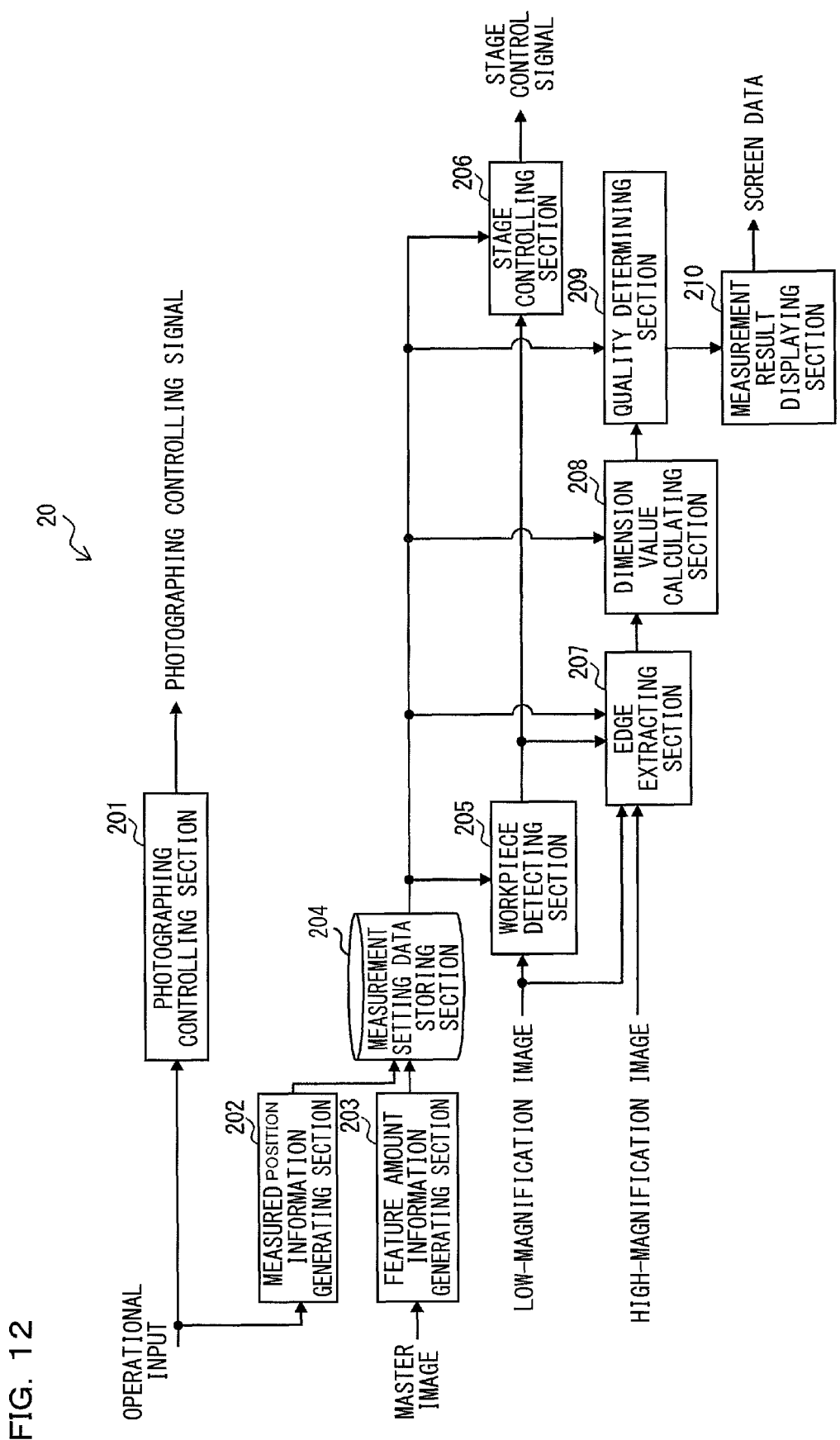
FIG. 12 is a block diagram showing a constitutional example of the control unit 20 of FIG. 1, showing an example of a functional configuration within the control unit 20.

FIG. 12 is a block diagram showing a constitutional example of the control unit 20 of FIG. 1, showing an example of a functional configuration within the control unit 20. This control unit 20 is made up of a photographing controlling section 201, a measured position information generating section 202, a feature amount information generating section 203, a measurement setting data storing section 204, a workpiece detecting section 205, a stage controlling section 206, an edge extracting section 207, a dimension value calculating section 208, a quality determining section 209, and a measurement result displaying section 210.

The photographing controlling section 201 generates a photographing controlling signal for controlling the imaging elements 155 and 158 of the measurement unit 10 and the illumination units 120, 130, and 141 based on operational inputs from the measurement unit 10, the keyboard 31 and the mouse 32, and outputs the signal to the measurement unit 10.

The feature amount information generating section 203 generates feature amount information for detecting the workpiece W from a photographed image, and stores the feature amount information as measurement setting data inside the measurement setting data storing section 204. This feature amount information is formed of a checkup pattern image, and generated based on a master image obtained by photographing a predetermined master workpiece with a low magnification.

The measured position information generating section 202 generates measured position information formed of a position to be measured and a measuring method based on an operational input, and stores the generated data as measurement setting data inside the measurement setting data storing section 204. This measured position information is generated by designating a position to be measured, a type of measurement and an illumination method with respect to the master image obtained by photographing the master workpiece with a high magnification.

The measurement setting data storing section 204 holds the feature amount information, the measured position information and the design value information as the measurement setting data. The feature amount information is feature information for checking which is used for detecting an arranged state, such as a location and posture, of the workpiece W within the workpiece image, and made up of a pattern image for pattern matching, geometrical shape information for geometrical shape correlated search, feature point information showing a feature point of the workpiece W. The design value information is formed of a design value set with respect to each position to be measured, and a tolerance associated with the design value.

The workpiece detecting section 205 specifies the position and the posture of the workpiece image W in the low-magnification workpiece image W1 based on the feature amount information. Specifically, the workpiece image W1 is compared with the checkup pattern image, to determine the position and the posture of the workpiece W.

The stage controlling section 206 generates a stage control signal for controlling the movable stage 12 based on the position and the posture specified by the workpiece detecting section 205 and the measured position information such that the position to be measured of the workpiece W is held within the high-magnification field of view. The stage controlling section 206 then outputs the generated signal to the measurement unit 10. Specifically, the movable stage 12 is moved with respect to the position to be measured, whose dimension measurement with a high magnification has been designated in the measured position information, such that the position to be measured stays within the high-magnification field of view.

In the stage controlling section 206, in the case of the presence of a plurality of workpieces W that cannot stay within the high-magnification field of view, the movable stage 12 are sequentially moved with respect to these works W such that positions to be measured stay within the high-magnification field of view. Further, in the case of the presence of a plurality of positions to be measured for the same workpiece W, which cannot stay within the high-magnification field of view, the movable stage 12 is sequentially moved with respect to these positions to be measured such that the positions to be measured stay within the high-magnification field of view. The high-magnification workpiece image W2 is automatically acquired at the time of movement of the position to be measured into the high-magnification field of view.

The edge extracting section 207 specifies the position to be measured from the arrange state and the measured position information of the workpiece W whose arranged state has been specified by the workpiece detecting section 205, and extracts an edge of the measured position information from the workpiece image. At that time, the position to be measured, whose dimension measurement with a low magnification has been designated in the measured position information, is subjected to edge extraction from the low-magnification image W1 and the position to be measured, whose dimension measurement with a high magnification has been designated in the measured position information, is subjected to edge extraction from the high-magnification image W2. Edge extraction is performed by analyzing a change in brightness value between adjacent pixels in image data inside an edge detection area designated in the measured position information.

The dimension value calculating section 208 calculates a dimension value of the position to be measured based on the edge extracted by the edge extracting section 207, and outputs the calculated value to the quality determining section 209. Specifically, a plurality of edge points obtained by edge extraction are fitted with a geometrical shape such as a straight line or an arc by means of a statistical technique such as the method of least squares, thereby to specify an edge of the workpiece W. When two parallel linear sections on the edge of the workpiece W are, for example, designated as the positions to be measured, a distance between these straight lines is calculated as a dimension value. Further, when a linear section and a feature point are designated, a distance between the straight line and the feature point is calculated as the dimension value. Moreover, when two linear sections with different inclinations are designated, an angle between these straight lines is calculated as the dimension value. Furthermore, when a part of a circle (arc) or the whole of the circle is designated as the positions to be measured, a diameter, a radius or a central coordinate of the circle is calculated as the dimension value.

The quality determining section 209 compares a difference, made between the dimension value calculated by the dimension value calculating section 208 and a design value corresponding thereto, with a corresponding tolerance, to perform quality determination on the dimension value with respect to each position to be measured, and quality determination on the workpiece W. The quality determination on the dimension value is performed by determining whether or not the difference (error) between the dimension value and the design value is within a tolerance range. Further, the quality determination on the workpiece W is performed based on the result of the quality determination on the dimension value with respect to each position to be measured.

The measurement result displaying section 210 creates screen data for displaying the dimension value and a result of the quality determination on the workpiece image W2, and outputs the generated data to the measurement unit 10. The measurement result such as the dimension value can be displayed by arbitrary designation of any of the workpiece images W2 acquired for dimension measurement.

According to the present embodiment, even when the workpiece W is arranged in an arbitrary posture and an arbitrary position on the movable stage 12, the workpiece W is automatically transferred into the high-magnification field of view and the dimension value of the position to be measured can be obtained so long as being arranged within the low-magnification field of view, and hence it is possible to measure desired dimensions with high accuracy. Further, since the workpiece W can be measured with a high magnification wherever and in whatever posture the workpiece is arranged so long as being arranged within the low-magnification field of view, it is possible to improve measurement accuracy while simplifying an operating procedure for dimension measurement, and also to reduce the time required for dimension measurement.

Moreover, since the position to be measured and the measuring method are designated with respect to the master image M2 obtained by photographing the master workpiece with a high magnification, it is possible to designate with a high magnification a position wished to be measured for the workpiece W having the same shape as the master workpiece. Furthermore, since the feature amount information formed of the checkup pattern image is generated based on the master image M1 obtained by photographing the master workpiece with a low magnification, checking between the pattern image and the low-magnification image obtained by photographing the workpiece W with a low magnification can lead to accurate specification of the position and the posture of the workpiece W having the same shape as the master workpiece.

Further, since the movable stage 12 is sequentially moved so as to allow the positions to be measured to stay within the high-magnification field of view, even in the case of the presence of a plurality of workpieces W that cannot stay within the high-magnification field of view, it is possible to automatically transfer these workpieces W sequentially into the high-magnification field of view, so as to obtain the dimension values of the positions to be measured. Moreover, since the movable stage 12 is sequentially moved so as to allow the positions to be measured to stay within the high-magnification field of view, even in the case of the presence of a plurality of positions to be measured for the same workpiece W, which cannot stay within the high-magnification field of view, it is possible to automatically transfer these positions to be measured sequentially into the high-magnification field of view, so as to obtain the dimension values of the positions to be measured.

In addition, the example of the case has been described in the present embodiment where the checkup pattern image is created from the master image M1 obtained by photographing the master workpiece with a low magnification and this pattern image is compared with the workpiece image W1 to specify the position and the posture of the workpiece W, but the present invention is not restricted to such a configuration. For example, it may be configured such that a checkup pattern image is created from the master image M2 obtained by photographing the master workpiece with a high magnification, and this pattern image is compared with the high-magnification workpiece image W2, to perform positioning on the workpiece W with high accuracy. That is, for improvement in accuracy of edge extraction, it may be configured such that the position and the posture of the workpiece image W in the workpiece image W2 are specified again using a pattern image obtained from the master image M2.

Further, although the example of the case has been described in the present embodiment where the low-magnification photographing and the high-magnification photographing are electrically switched, the present invention does not restrict the method for switching the photographing magnification to this. For example, the present invention includes one which mechanically switches the light-receiving lens (objective lens) on the movable stage 12 side, so called a revolver type. That is, an objective lens unit made up of a light-receiving lens for low-magnification photographing and a light-receiving lens for high-magnification photographing is rotated with respect to a set of image forming unit made up of a diaphragm plate, an image forming lens and an imaging element, to switch between the low-magnification photographing and the high-magnification photographing.

EXPLANATION OF REFERENCE NUMERALS

1 dimension measuring apparatus
10 measurement unit
10*a* housing
110 stage driving unit
111 Z driving section
112 XY driving section
120 transmitted illumination unit
121 transmitted illumination light source
122 mirror
123 optical lens
130 ring illumination unit
141 coaxial epi-illumination light source
142 half mirror
150 light-receiving lens unit
151 light-receiving lens
152 half mirror
153,156 diaphragm plate
154,157 image forming lens
155 imaging element for low-magnification photographing
158 imaging element for high-magnification photographing
11 display
12 movable stage
13 detection area
14*a* XY-position adjustment knob
14*b* Z-position adjustment knob
15 power switch
16 measurement start button
20 control unit
201 photographing controlling section
202 measured position information generating section
203 feature amount information generating section
204 measurement setting data storing section
205 workpiece detecting section
206 stage controlling section
207 edge extracting section
208 dimension value calculating section
209 quality determining section
210 measurement result displaying section
31 keyboard
32 mouse
A1 boundary of low-magnification field of view
A2 boundary of high-magnification field of view
A3 field-of-view center
M1, M2 master image M11, M12 edge
M21 edge detection area
W workpiece
W1, W2 workpiece image

What is claimed is:

1. A dimension measuring apparatus, in which a low-magnification field of view is formed while a high-magnification field of view being narrower than the low-magnification field of view is formed within the low-magnification field of view, and a workpiece on a stage is photographed with different photographing magnifications to measure a dimension of the workpiece, the apparatus comprising:
   a movable stage that is movable in XY directions;
   a measurement setting data storing section that holds feature amount information for detecting a workpiece from a photographed image, the feature amount information being a pattern image based on a first master image photographed with a low magnification, measured position information showing a position to be measured which is designated as an object to be measured, the measured position information set based on a second master image with a high magnification, and design value information formed of a design value set with respect to each position to be measured and a tolerance associated with the design value;
   a low-magnification imaging section that photographs, with the low magnification, the workpiece within the low-magnification field of view, to generate a low-magnification image;
   a workpiece detecting section that specifies a position and a posture of the workpiece in the low-magnification image based on the feature amount information;
   a stage controlling section that controls the movable stage based on the specified location and posture such that the position to be measured of the workpiece stays within the high-magnification field of view;
   a high-magnification imaging section that photographs, with the high magnification, the position to be measured which has moved into the high-magnification field of view, to generate a high-magnification image, wherein center of the high-magnification field of view coincides with center of the low-magnification field of view;
   an edge extracting section that extracts an edge of the position to be measured from the high-magnification image based on the measured position information;
   a dimension value calculating section that obtains a dimension value of the position to be measured based on the extracted edge; and
   a quality determining section that compares a difference made between the dimension value calculated by the dimension value calculating section and the design value corresponding thereto, with the corresponding tolerance, to perform quality determination on the dimension value with respect to each position to be measured,
   wherein in the case of the presence of two or more workpieces that cannot stay within the high-magnification field of view, the stage controlling section sequentially moves the movable stage with respect to these workpieces such that positions to be measured stay within the high-magnification field of view.

2. The dimension measuring apparatus according to claim 1, comprising:
   a measured position information generating section that designates a position to be measured and a measuring method with respect to the second master image, the second master image being obtained by the high-magnification imaging section photographing a master workpiece with the high magnification, to generate the measured position information; and
   a feature amount information generating section that generates the feature amount information formed of a checkup pattern image based on the first master image, the first master image being obtained by the low-magnification imaging section photographing the master workpiece with the low magnification.

3. The dimension measuring apparatus according to claim 1, wherein in the case of the presence of two or more positions to be measured for the same workpiece, which cannot stay within the high-magnification field of view, the stage controlling section sequentially moves the movable stage with respect to the positions to be measured such that the positions to be measured stay within the high-magnification field of view.

4. The dimension measuring apparatus according to claim 1, wherein,
   the edge extracting section performs, based on the low-magnification image, edge extraction on the position to be measured whose dimension measurement with the low magnification has been designated in the measured position information, and
   the stage controlling section moves the movable stage with respect to the position to be measured whose dimension measurement with the high magnification has been designated in the measured position information such that the position to be measured stays within the high-magnification field of view.

5. A dimension measuring method in which a low-magnification field of view is formed while a high-magnification field of view being narrower than the low-magnification field of view is formed within the low-magnification field of view, and a workpiece on a stage is photographed with different photographing magnifications to measure a dimension of the workpiece,
   the method comprising:
      a measurement setting data storing step for storing feature amount information for detecting a workpiece from a photographed image, the feature amount information being a pattern image based on a first master image photographed with a low magnification, measured position information showing a position to be measured which is designated as an object to be measured, the measured position information set based on a second master image with a high magnification, and design value information formed of a design value set with respect to each position to be measured and a tolerance associated with the design value;
      a low-magnification imaging step for photographing, with the low magnification, the workpiece within the low-magnification field of view, to generate a low-magnification image;
      a workpiece detecting step for specifying a position and a posture of the workpiece in the low-magnification image based on the feature amount information;
      a stage controlling step for controlling the movable stage in XY directions based on the specified location and posture such that the position to be measured of the workpiece stays within the high-magnification field of view;
      a high-magnification imaging step for photographing, with the high magnification, the position to be measured which has moved into the high-magnification field of view, to generate a high-magnification image, wherein center of the high-magnification field of view coincides with center of the low-magnification field of view;

an edge extracting step for extracting an edge of the position to be measured from the high-magnification image based on the specified location and posture and the measured position information;

a dimension value calculating step for obtaining a dimension value of the position to be measured based on the extracted edge; and a quality determining step for comparing a difference made between the dimension value calculated by the dimension value calculating section and the design value corresponding thereto, with the corresponding tolerance, for performing quality determination on the dimension value with respect to each position to be measured, wherein in the case of the presence of two or more workpieces that cannot stay within the high-magnification field of view, the stage controlling section sequentially moves the movable stage with respect to these workpieces such that positions to be measured stay within the high-magnification field of view.

6. A non-transitory storage medium comprising instructions wherein when executed causes a computer to perform:

a measurement setting data storing procedure for storing feature amount information for detecting a workpiece from a photographed image, the feature amount information being a pattern image based on a first master image photographed with a low magnification, measured position information showing a position to be measured which is designated as an object to be measured, the measured position information set based on a second master image with a high magnification, and design value information formed of a design value set with respect to each position to be measured and a tolerance associated with the design value;

a low-magnification imaging procedure for photographing, with the low magnification, the workpiece within the low-magnification field of view, to generate a low-magnification image;

a workpiece detecting procedure for specifying a position and a posture of the workpiece in the low-magnification image based on the feature amount information;

a stage controlling procedure for controlling the movable stage in XY directions based on the specified location and posture such that the position to be measured of the workpiece stays within the high-magnification field of view;

a high-magnification imaging procedure for photographing, with the high magnification, the position to be measured which has moved into the high-magnification field of view, to generate a high-magnification image, wherein center of the high-magnification field of view coincides with center of the low-magnification field of view;

an edge extracting procedure for extracting an edge of the position to be measured from the high-magnification image based on the specified location and posture and the measured position information;

a dimension value calculating procedure for obtaining a dimension value of the position to be measured based on the extracted edge; and a quality determining procedure for comparing a difference made between the dimension value calculated by the dimension value calculating section and the design value corresponding thereto, with the corresponding tolerance, for performing quality determination on the dimension value with respect to each position to be measured, wherein in the case of the presence of two or more workpieces that cannot stay within the high-magnification field of view, the stage controlling section sequentially moves the movable stage with respect to these workpieces such that positions to be measured stay within the high-magnification field of view.

* * * * *